United States Patent Office 3,520,715
Patented July 14, 1970

3,520,715
HOT-PRESSED ARTICLES HAVING A SURFACE LAMINATION OF PAPER IMPREGNATED WITH A FORMALDEHYDE - MELAMINE REACTION PRODUCT AND METHOD OF MAKING
Kenneth D. Meiser, Dallas, Tex., assignor to Plastics Manufacturing Company, Dallas, Tex., a corporation of Texas
No Drawing. Continuation-in-part of application Ser. No. 301,180, Aug. 8, 1963. This application Oct. 6, 1967, Ser. No. 673,286
Int. Cl. B32b 23/08, 27/08, 27/42
U.S. Cl. 117—76                                   3 Claims

ABSTRACT OF THE DISCLOSURE

A paper foil which provides a surface of improved stain resistance and luster retention when used to form the surface lamination of a hot-pressed article; a method of producing such foil by preparing a paper foil comprising cellulose fibers, impregnated with a thermosetting product of the reaction of formaldehyde and melamine in a molar ratio between 2:1 and 2.5:1, coating the side of the foil that is to form the outer surface of the lamination, by applying an aqueous solution of a thermosetting product of the reaction of formaldehyde and melamine in a molar ratio from 1.2:1 to 1.7:1, and drying; and a hot-pressed article in which such foil is used to form the surface lamination.

CROSS-REFERENCE TO RELATED APPLICATION

This is a continuation-in-part of application Ser. No. 301,180, filed Aug. 8, 1963, and now abandoned.

BACKGROUND OF THE INVENTION

This invention relates to the production of hot-pressed articles having a surface of improved stain resistance and luster retention, by the use of a surface lamination of paper which is impregnated with a formaldehyde-melamine reaction product and also has a coating of a formaldehyde-melamine reaction product. More particularly, the invention relates to a novel combination in which there is a critical relationship between the molar formaldehyde-melamine ratio in the reaction product with which the paper lamination is impregnated and the molar formaldehyde-melamine ratio in the reaction product with which the paper lamination is coated.

A product of the reaction of formaldehyde and melamine in a relatively low molar ratio is relatively insoluble and therefore difficult to prepare, and also is slow-curing in a hot-pressing operation. Therefore, it is customary to react formaldehyde and melamine in a molar ratio high enough to produce a product which has an adequate solubility and an adequate speed of cure during hot pressing, while avoiding any deleterious excess of formaldehyde.

U.S. Pat. No. 3,318,760 describes a method of producing laminates by hot pressing, using a surface lamination consisting of paper which is impregnated with a formaldehyde-melamine reaction product, and also has a coating of a formaldehyde-melamine reaction product. The patent states that the reaction product in the coating is a product of the reaction of formaldehyde and melamine in a molar ratio which preferably is between 2:1 and 2.2:1. The molar ratio of formaldehyde to melamine in the reaction product with which the paper lamination is impregnated is not described in the patent, but presumably is the same as the molar ratio of the reaction product in the coating, since there would be no reason for using in the coating a reaction product having a molar formaldehyde-melamine ratio different from that of the reaction product with which the paper lamination is impregnated.

The distinguishing characteristic of the reaction product used in the coating described in U.S. Pat. No. 3,318,760 is that the reaction product in the coating is one that has been condensed to an advanced stage and is therefore insoluble in water. Because of the insolubility of the reaction product which is used for coating the paper which is to form the surface lamination, the patent discloses that the reaction product is ordinarily applied to the surface of the paper in the form of a dispersion in an organic solvent.

The process disclosed in US. Pat. No. 3,318,760 was used commercially for a short time, but was unsuccessful because the coating of the insoluble reaction product, which was applied in the form of a dispersion, was insufficiently adherent and tended to flake off the surface of the paper during handling of the sheet prior to the hot-pressing operation.

SUMMARY OF THE INVENTION

The principal object of the invention is the production of hot-pressed articles having a surface of improved stain resistance and luster retention, by the use of a surface lamination of paper which is impregnated with a formaldehyde-melamine reaction product and also has a coating of a formaldehyde-melamine reaction product which can be applied in the form of an aqueous solution so that it is permanently bonded and cannot flake off. More specific objects and advantages are apparent from the following detailed description, which is intended to disclose and illustrate but not to limit the invention.

The present invention is based upon the discovery that a hot-pressed article, having a surface lamination consisting of paper which has been impregnated with a formaldehyde-melamine reaction product and also has a coating of a formaldehyde-melamine reaction product, has a surface of remarkably improved stain resistance and luster retention if a critical relationship or discrepancy is maintained between the molar formaldehyde-melamine ratio of the reaction product with which the surface lamination is coated and the molar formaldehyde-melamine ratio of the reaction product with which the surface lamination is impregnated.

In order that the critical relationship or discrepancy between the molar ratios may be present, so as to produce the described improvement, the molar formaldehyde-melamine ratio of the reaction product in the coating must be within a certain critical range, and the molar formaldehyde-melamine ratio of the reaction product with which the surface lamination is impregnated must be within a different critical range, as hereinafter described.

The reaction product with which the paper surface lamination is impregnated is a product of the reaction of formaldehyde and melamine in a molar ratio between 2:1 and 2.5:1, preferably from 2.0:1 to 2.2:1. Such a molar ratio is high enough so that the reaction product is sufficiently soluble to permit it to be prepared without difficulty, and also is sufficiently fast-curing to permit it to be cured without difficulty during the hot-pressing of the laminate.

The reaction product with which the paper surface lamination is coated, on the other hand, is a product of the reaction of formaldehyde and melamine in a molar ratio from 1.2:1 to 1.7:1. This reaction product is less soluble than the reaction product with which the paper lamination is impregnated, but it can be obtained in the form of an aqueous solution by the use of proper precautions, such as dilution with an additional amount of water. The reaction product used in the coating also is relatively slow-curing, but it has been found that the presence of a coating of this reaction product on the surface lamination does not appreciably interfere with curing of the laminate during hot pressing.

In the practice of the invention, the sheet of paper which is to form the surface lamination is first impregnated with an aqueous solution of a formaldehyde-melamine reaction product and dried, and the dried sheet is then coated with an aqueous solution of a different formaldehyde-melamine reaction product, on the side that is to form the outer surface of the lamination. Because of the fact that the reaction product with which the paper was impregnated is a water-soluble reaction product, the coating of the dried paper with an aqueous solution of another formaldehyde-melamine reaction product necessarily causes some dissolving of the first reaction product adjacent to the coated surface. Thus some intermingling of the two reaction products takes place immediately after the aqueous coating solution is applied.

It has been discovered that the addition to the surface lamination of a coating of a reaction product, the formaldehyde-melamine ratio of which is substantially lower than that of the reaction product with which the paper is impregnated, as herein described, produces a remarkable improvement in the stain resistance and luster retention of the surface of the laminate, even though it does not appreciably interfere with the curing of the laminate during the hot-pressing operation. The improvement in stain resistance and luster retention which is produced by the addition of the coating in the practice of the present invention is due to the fact that the molar formaldehyde-melamine ratio of the reaction product in the coating is substantially lower than the molar formaldehyde-melamine ratio of the reaction product with which the paper is impregnated. If the formaldeyde-melamine ratio of the reaction product in the coating is the same as the formaldehyde-melamine ratio of the reaction product with which the paper is impregnated, the addition of the coating produces substantially no improvement in the stain resistance or luster retention of the surface of the finished laminate.

In the practice of the present invention, when a paper sheet is impregnated with an aqueous solution of a formaldehyde-melamine reaction product, dried, and coated on one surface with an aqueous solution of a different formaldehyde-melamine reaction product, and again dried, an excellent bond is formed between the reaction product in the coating and the reaction product with which the paper is impregnated, so that there is no possibility that the coating will flake off during handling of the sheet prior to the hot-pressing operation.

PRODUCTION OF MOLDED ARTICLES

The present invention is useful in the production of molded articles, particularly dinnerware such as cups, plates and saucers. Articles of molded dinnerware commonly are decorated by the incorporation of a surface lamination of paper impregnated with a formaldehyde-melamine reaction product. The sheet of paper which is to form such a surface lamination is printed on its underside with a design, which usually is in several colors. In the molding operation, a molding composition is used to form the body of the plate or other dinnerware article, and the impregnated paper sheet is used to form a surface lamination on one side of the article. In the molded article, this surface lamination is substantially transparent, so that the printed design is very clearly visible and yet is protected because it is on the underside of the lamination.

Heretofore, decorated molded dinnerware made by the known methods had the disadvantage that the decorated surface formed by the surface lamination had less initial luster and was more subject to staining and loss of luster during use than a surface of the molded article on which no surface lamination was used. Thus in the use of known methods, the application of a surface lamination in the production of a molded dinnerware article made it possible to decorate the article with a design, but only by sacrificing the stain resistance, initial luster and luster retention of the decorated surface. Such sacrifice in the stain resistance, initial luster and luster retention of the decorated surface has been particularly undesirable because the decorated surface, such as the upper surface of a plate, is the surface which is usually exposed to view during use of the article. These deficiencies have made such decorated dinnerware generally unacceptable for commercial applications such as use in restaurants or institutions. In such commercial applications, staining and loss of luster are serious problems, becuse each piece of dinnerware is used more frequently than in household use. For these reasons decorated dinnerware, which is sold in large quantities for household use, has found very little use in restaurants.

However, these deficiencies are remedied by the present invention, because the present invention makes it possible to produce articles having a surface lamination exhibiting excellent stain resistance, initial luster and luster retention. Accordingly, the present invention makes possible the production of decorated dinnerware which is satisfactory for use in restaurants because it can be used indefinitely without appreciable staining and without appreciable loss of luster on the decorated or laminated surface.

In the production of a molded article embodying the present invention, the molding composition which is used to form the body of the article preferably comprises a cellulose filler impregnated with a formaldehyde-melamine reaction product. Such a molding composition may be prepared by impregnating a cellulose filler with the same solution of a reaction product which is used to impregnate the sheet of paper that is to form the surface lamination of the molded article.

A reaction product for use in impregnating a cellulose filler to produce a molding composition, or for use in impregnating the surface lamination in the practice of the present invention may be prepared by dissolving melamine in commercial 37% aqueous formaldehyde solution to which a base such as sodium hydroxide has been added in an amount such that the pH after the solution has been heated to about 180° F. to dissolve the melamine is from about eight to about nine. The molar proportions of formaldehyde to melamine are between 2:1 and 2.5:1 preferably from 2.0:1 to 2.2:1. The solution is refluxed until the reaction has progressed far enough so that the solution will remain clear and stable upon cooling to 70° F. Before this solution is used to impregnate a cellulose filler to produce a molding composition or to impregnate a sheet of paper to be used as a surface lamination, the pH is brought to a value from about 6.5 to about 8 by addition of an acidic material, for example zinc sulfate or an organic acid such as lactic acid.

A molding composition may be prepared by using this solution to impregnate bleached sulfite pulp, or any other cellulosic filler. The dried impregnated filler, which preferably contains from about 65 to 75% by weight of formaldehyde-melamine reaction product and from about 25 to 35% of cellulose, is ground to a fine powder, together wth modifiers such as pigments, zinc stearate or other lubricants and phthalic anhydride or other acidic materials which serve as curing catalysts.

In the practice of the present invention, an aqueous solution of a formaldehyde-melamine reaction product so prepared may be used to impregnate a sheet of paper, comprising cellulosic fibers, which is to be used as a surface lamination in the hot-pressing operation. The paper may be of the type commonly used in the production of decorated foil for use as a surface lamination in the molding of dinnerware.

This type of paper consists of alpha cellulose fiber and rayon fiber, the proportion of each fiber usually being between 40 and 60%. The rayon fiber is believed to impart better translucency and higher strength, but paper consisting entirely of alpha cellulose fiber may be employed if desired.

The impregnation of the sheet of paper may be conducted in accordance with the procedure conventionally employed for the production of formaldehyde-melamine-impregnated foil. The paper preferably is impregnated in a continuous process in which the paper is fed from a roll, impregnated and dried.

In the production of such impregnated paper, the degree of impregnation ordinarily is such that the dried product consists of about 60 to about 70% by weight of formaldehyde-melamine reaction product and about 30 to about 40% by weight of paper. If more than about 70% by weight of formaldehyde-melamine reaction product is present, the impregnated paper is so brittle that corners of the paper may break off during a subsequent printing operation. If the formaldehyde-melamine content of the impregnated paper is less than about 60%, the impregnated paper when used as a surface lamination produces a surface that is too dull or irregular in appearance. The present method, in which a coating is applied to one surface of the impregnated paper, makes it possible to employ impregnated paper in which the formaldehyde-melamine content is in the lower part of the 60%–70% range.

In the practice of the present invention, one surface of the dried impregnated paper is coated with a thermosetting product of the reaction of formaldehyde and melamine in a molar ratio between 1.2:1 and 1.7:1. This reaction product preferably is applied in the form of an aqueous solution in order that the resulting coating will be firmly bonded to the impregnated paper and will not flake off during a subsequent operation in which the uncoated surface of the paper is printed.

An aqueous solution for use in coating a surface of the impregnated paper in the practice of the present invention may be prepared by dissolving one mol of melamine in an aqueous solution containing from 1.2 to 1.7 mols of formaldehyde, the concentration of the aqueous solution of formaldehyde being such that the concentration of the final solution will be from about 30% to about 70% solids. The solids content of the final solution is calculated by assuming that one mol of water is split off during the reaction for every three mols of formaldehyde. Before the melamine is added to the formaldehyde solution, a base such as sodium hydroxide or triethanolamine is added in an amount such that the pH after the solution has been heated to about 180° F. to dissolve the melamine is from about 8 to about 9. The solution is reacted by refluxing until cloudiness appears upon addition of one drop of the reaction solution to 100 cc. of water at 100° F. Before this solution is used to coat the impregnated paper, the pH is brought to a value from about 6.5 to about 8 by addition of an acidic material as in the case of the impregnating solution.

In order to increase the uniformity with which the surface of the paper is coated and to inhibit penetration of the solution into the paper, a water-soluble alcohol such as ethyl, propyl, isopropyl, butyl or isobutyl alcohol preferably is incorporated in an amount ranging from about 0.5% to about 10% of the total weight of the solution.

The coating of the impregnated paper may be carried out by spraying, roll-coating, silk screening, floating or brushing, followed by drying.

Although the product with which a surface of the foil is coated may be a product of the reaction of formaldehyde and melamine in any molar ratio from about 1.2:1 to about 1.7:1, the best results are obtained by the use in the coating of a thermosetting product of the reaction of formaldehyde and melamine in a molar ratio from about 1.3 to about 1.6.

The amount of the coating material to be applied in the practice of the present invention depends upon the degree of penetration of the coating material into the paper and also depends to some extent upon the amount of formaldehyde-melamine reaction product which is already present as an impregnant. Ordinarily, good results can be obtained by applying to the impregnated paper a coating of a formaldehyde-melamine reaction product in an amount ranging from about 2 to about 10 grams per square foot (dry weight), assuming that the foil to be coated contains about 67% by weight of a formaldehyde-melamine reaction product as an impregnant, and also assuming that there is no undue penetration of the coating solution into the paper. The application of an excessive amount of the coating to the foil will result in a surface which has a tendency to craze or crack after the final molded article has been formed.

The printing of the under surface of the foil may be carried out either before or after the other surface is coated in the practice of the invention. The printing operation is the same as the conventional operation of printing foil, and in a finished article embodying the present invention the foil forms a surface lamination which is substantially transparent so that the printed underside of the foil is clearly visible through the foil.

The production of molded articles embodying the present invention is carried out in the ordinary manner, using the present coated foil as a surface lamination.

Any commercial molding composition may be employed to form the body of the molded article. Preferably the molding composition employed is one which has been prepared by impregnating a cellulose filler with a formaldehyde-melamine reaction product, drying and grinding as hereinbefore described.

In the production of a molded article embodying the present invention, the molding composition, usually in the form of a preheated preform, is placed in a mold which is at a temperature of about 320° F. The mold is then closed and the molding composition is held under a pressure of about 1 to 2 tons per square inch for about ten to forty-five seconds, so that the mold can be reopened without the formation of blisters on the molded piece. A coated foil of the present invention which has been cut to the desired shape is then laid on the piece in the mold, with the printed and uncoated side of the foil in contact with the piece, and the mold is again closed to hold the product under the same pressure for an additional period of about 60 to 90 seconds. The mold is then opened and the finished piece is ejected.

Example 1

In order to compare the results obtained by using various molar ratios of formaldehyde to melamine, six coating solutions are prepared by the following procedure:

Melamine (126.13 parts) is dissolved in a 37% aqueous formaldehyde solution which has been diluted with the amount of water listed in Table 1 below. Before addition of the melamine, sodium hydroxide is added to the formaldehyde solution in an amount such that the pH of the resulting reaction solution is between 7.9 and 8.5. The reaction solution is refluxed until the addition of a drop of the solution to 100 cc. of water at 100° F. causes cloudiness to appear, and the reaction solution is then cooled to room temperature. In each case the product contains an amount of water equal to the total amount of melamine and formaldehyde used for the reaction. Table 1 below shows the number of parts by weight of 37% aqueous formaldehyde solution and the number of parts by weight of additional water used in preparing the reaction solution in each case, and shows the number of mols of formaldehyde used for each mol of melamine:

TABLE 1

| Amount of 37% formaldehyde solution | Amount of water | Molar ratio of formaldehyde to melamine |
|---|---|---|
| 97.40 | 100.81 | 1.2 |
| 105.51 | 98.70 | 1.3 |
| 113.62 | 96.59 | 1.4 |
| 121.78 | 94.47 | 1.5 |
| 129.86 | 92.37 | 1.6 |
| 137.98 | 90.25 | 1.7 |

Example 2

Each of the solutions prepared in accordance with Example 1 is divided into two parts. The pH of one part is adjusted to a value between 6.6 and 6.9 by addition of lactic acid, and the pH of the other part is adjusted to a value between 6.6 and 6.9 by addition of a p-toluene sulfonic acid. Each part of the solution is used to coat one side of a sheet of foil of the type which is used commercially as a surface lamination in the molding of articles from formaldehyde-melamine molding compositions. Each coated sheet of foil is then dried at 250° F. for about one minute. The foil consists of an impregnated paper containing about 67% by weight of a thermosetting product of the reaction of formaldehyde and melamine in a molar ratio of about 2.1:1, and containing about 33% by weight of cellulosic fibers about one-half of which are alpha cellulose and about one-half of which are rayon. In each case the weight of the coating material on the dried coated foil is from 4.0 to 4.8 grams per square foot. Each of the coated sheets of foil, which has a design printed on its uncoated side and is circular in shape, is used as a surface lamination in the molding of a salad plate approximately seven inches in diameter. In each case a commercial alpha cellulose-filled formaldehyde-melamine molding composition is employed, the molar ratio of formaldehyde to melamine in the molding composition being 2.1:1. A preheated preform of the molding composition is first molded at a temperature of 315° F. and under a pressure of about 3000 pounds per square inch for forty-five seconds, and the mold is then opened and the foil is placed on top of the molded piece with the printed side of the foil in contact with the piece. The mold is then closed to hold the piece under the same pressure and temperature for eighty seconds, and the finished piece is then ejected from the mold. A control sample also is molded by the same procedure, using the same molding composition and using an uncoated sample of the same foil. Each of the molded pieces is then sawed in half, and one-half of each piece is tested by immersing it in a test bath which has been prepared by adding instant coffee to water in an amount equal to one teaspoon of coffee per cup of water. The test bath containing the 13 samples is held at a temperature of 180° F. for 40 hours, and the samples are then removed from the bath, rinsed and dried. The results of the test are determined by observing the degree to which each sample is stained and the degree to which the luster of each sample is impaired. In the case of the control sample, both the staining and the loss of luster are substantially greater on the laminated side of the sample than on the reverse side of the sample. In both of the samples made with a coating having a molar formaldehyde-melamine ratio of 1.7:1, the staining and loss of luster on the laminated side of the sample are appreciably less than on the reverse side of the sample, and substantially less than on the laminated side of the control sample. The laminated side of each of the samples made with a coating having a molar formaldehyde-melamine ration of 1.6:1 shows slightly less staining and slightly less loss of luster than the laminated sides of the samples in which the molar ratio is 1.7:1. The laminated side of each of the samples made with coatings having molar formaldehyde-melamine ratios of 1.5:1, 1.4:1, 1.3:1 and 1.2:1 shows substantially less staining and substantially less loss of luster than the molding composition itself as observed on the reverse side of each sample; in fact, the staining and the loss of luster on the laminated side of each of these samples are barely appreciable, whereas the staining and the loss of luster on the reverse side of each of these samples is very appreciable, as compared with the untested half of each piece.

PRODUCTION OF LAMINATES

Although the invention has been described by way of example in its application to the production of decorated molded articles, the invention also is applicable generally to the production of laminated articles.

A typical laminated article is a sheet, for example a table top or counter top, which is produced by hot-pressing a number of sheets of resin-impregnated paper. A sheet of alpha cellulose paper impregnated with a formaldehyde-melamine reaction product is commonly used to form the surface lamination. The sheet of impregnated paper which forms the surface lamination usually is not printed. However, underlying this surface sheet there is usually another sheet of paper which is impregnated with a formaldehyde-melamine resin and which is heavily pigmented and has a design printed on its top surface. The sheets underlying this second sheet usually consist of kraft paper impregnated with a phenol-formaldehyde resin. The assemblage of such sheets customarily is subjected to heat and pressure to convert the impregnating resins to their infusible state and then is cooled under pressure to produce the finished laminate.

Improved results may be obtained in the production of such a laminate by using as the surface lamination a coated foil embodying the present invention, prepared as hereinbefore described. The resulting surface of the finished laminated article has the same excellent stain resistance and luster retention as the surface obtained by using the coated foil to form a surface of a molded article. Also, the use of the present coated foil as the surface lamination in a laminate makes it possible to obtain a finished surface having excellent initial luster by merely hot-pressing and then opening the press, without the step of cooling under pressure that has been necessary heretofore to produce satisfactory initial luster.

I claim:
1. A method of producing a paper foil which provides a surface of improved stain resistance and luster retention when used to form the surface lamination of a hot-pressed article, comprising the step of preparing a paper foil which comprises cellulosic fibers and is impregnated with a thermosetting product of the reaction of formaldehyde and melamine in a molar ratio between 2:1 and 2.5:1, wherein the improvement comprises the further steps of coating the side of the foil that is to form the outer surface of the lamination, by applying an aqueous solution of a thermosetting product of the reaction of formaldehyde and melamine in a molar ratio from 1.2:1 to 1.7:1, and drying.

2. A paper foil which provides a surface of improved stain resistance and luster retention when used to form the surface lamination of a hot-pressed article, and which comprises cellulosic fibers and is impregnated with a thermosetting product of the reaction of formaldehyde and melamine in a molar ratio between 2:1 and 2.5:1, wherein the improvement comprises a coating, on the side of the foil that is to form the outer surface of the lamination, of a thermosetting product of the reaction of formaldehyde and melamine in a molar ratio from 1.2:1 to 1.7:1.

3. A hot-pressed article comprising a surface lamination of paper which provides a surface of improved stain resistance and luster retention, and which comprises cellulosic fibers and is impregnated with a cured product of the reaction of formaldehyde and melamine in a molar ratio between 2:1 and 2.5:1, wherein the improvement comprises a coating, on the outer surface of the lamination, of a cured product of the reaction of formaldehyde and melamine in a molar ratio from 1.2:1 to 1.7:1.

References Cited

UNITED STATES PATENTS

| | | | |
|---|---|---|---|
| 2,260,239 | 10/1941 | Talbot | 260—72 |
| 3,131,116 | 4/1964 | Pounds | 161—258 |
| 3,218,225 | 11/1965 | Petropoulos | 161—248 |
| 3,318,760 | 5/1967 | Boenig | 161—263 |

JOHN T. GOOLKASIAN, Primary Examiner

W. E. HOAG, Assistant Examiner

U.S. Cl. X.R.

117—155; 161—156, 164, 166, 258, 263